United States Patent [19]

Narasaka et al.

[11] Patent Number: 4,478,199

[45] Date of Patent: Oct. 23, 1984

[54] METHOD OF CONTROLLING EXHAUST-GAS RECIRCULATION IN INTERNAL COMBUSTION ENGINE

[75] Inventors: Shin Narasaka, Yono; Kazuo Otsuka, Higashikurume; Eiji Kishida, Tokyo, all of Japan

[73] Assignee: Honda Giken Kogyo Kabushiki Kaisha, Tokyo, Japan

[21] Appl. No.: 428,645

[22] Filed: Sep. 30, 1982

[30] Foreign Application Priority Data

Mar. 19, 1982 [JP] Japan .................. 57-43800

[51] Int. Cl.³ ............................ F02M 25/06
[52] U.S. Cl. .................... 123/571; 123/568
[58] Field of Search ............... 123/571, 568, 569

[56] References Cited
U.S. PATENT DOCUMENTS

| | | | |
|---|---|---|---|
| 4,164,032 | 8/1979 | Nohira et al. | 123/571 |
| 4,385,616 | 5/1983 | Kobayashi et al. | 123/571 |
| 4,390,001 | 6/1983 | Fujimoto | 123/571 |
| 4,399,791 | 8/1983 | Kobayashi et al. | 123/571 |

Primary Examiner—Wendell E. Burns
Attorney, Agent, or Firm—Armstrong, Nikaido, Marmelstein & Kubovcik

[57] ABSTRACT

A method of controlling the recirculation of exhaust gases in an internal combustion engine provided with an exhaust-gas recirculation system by which the exhaust gases emitted from the exhaust manifold are partially recirculated into the intake manifold of the engine, comprising cutting off the recirculation of exhaust gases to the intake manifold of the engine when the engine is being warmed up, recirculating exhaust gases to the intake manifold of the engine at a rate variable in a predetermined required exhaust-gas recirculation ratio to the rate at which air is circulated to the intake manifold of the engine after the engine is warmed up, and recirculating exhaust gases to the intake manifold of the engine with a reduced exhaust-gas recirculation ratio lower than said required exhaust-gas recirculation ratio during a transient period of time intervening the conditions in which the engine is being warmed up and the conditions in which the engine has been warmed up.

6 Claims, 5 Drawing Figures

METHOD OF CONTROLLING EXHAUST-GAS RECIRCULATION IN INTERNAL COMBUSTION ENGINE

FIELD OF THE INVENTION

The present invention relates to a method of controlling the exhaust-gas recirculation rate in an automotive internal combustion engine equipped with an exhaust-gas recirculation system.

BACKGROUND OF THE INVENTION

With a view to controlling the formation of toxic nitrogen oxides ($NO_x$) in the exhaust gases emitted from an internal combustion engine particularly for automotive use, an exhaust-gas recirculation system has been developed by means of which the exhaust gases delivered from the power cylinders of the engine are recirculated in regulated proportion to the intake system of the engine. The exhaust gases thus recirculated into the intake system of the engine give rise to a decrease in the maximum temperature of combustion in the power cylinders and contribute to reduction in the concentration of the toxic nitrogen oxides in the exhaust gases to be emitted from the power cylinders.

An exhaust-gas recirculation system of this nature is usually designed to remain inoperative when the engine is operating at low temperatures and to start the recirculation of the exhaust gases at a regulated rate after the engine is warmed up. This is because of the fact that the combustible charges supplied to the power cylinders are fired under unstable conditions when the engine is operating cold and accordingly that the recirculation of exhaust gases under such conditions would invite remarkable deterioration of the performance of the engine. The fact is, however, that toxic nitrogen oxides are contained in a not negligible concentration in the exhaust gases emitted from an engine under cold running conditions and, for this reason, it is desirable to effect the recirculation of the exhaust gases not only after the engine is warmed but when the engine is being warmed up.

It is, accordingly, an important object of the present invention to provide a method of controlling the exhaust-gas recirculation rate in an automotive internal combustion engine equipped with an exhaust-gas recirculation system.

SUMMARY OF THE INVENTION

In accordance with an outstanding aspect of the present invention, there is provided a method of controlling the recirculation of exhaust gases in an internal combustion engine provided with an exhaust-gas recirculation system by which the exhaust gases emitted from the exhaust manifold are partially recirculated into the intake manifold of the engine, comprising cutting off the recirculation of exhaust gases to the intake manifold of the engine when the engine is being warmed up, recirculating exhaust gases to the intake manifold of the engine at a rate variable in a predetermined required exhaust-gas recirculation ratio to the rate at which air is circulated to the intake manifold of the engine after the engine is warmed up, and recirculating exhaust gases to the intake manifold of the engine with a reduced exhaust-gas recirculation ratio lower than said required exhaust-gas recirculation ratio during a transient period of time intervening the conditions in which the engine is being warmed up and the conditions in which the engine has been warmed up. The above mentioned reduced exhaust-gas recirculation ratio may be either continuously or stepwise varied from a predetermined value to said required exhaust-gas recirculation ratio.

BRIEF DESCRIPTION OF THE DRAWINGS

The features and advantages of a method according to the present invention will be more clearly appreciated from the following description taken in conjunction with the accompanying drawings in which.

DETAILED DESCRIPTION OF THE INVENTION

Figure 1:
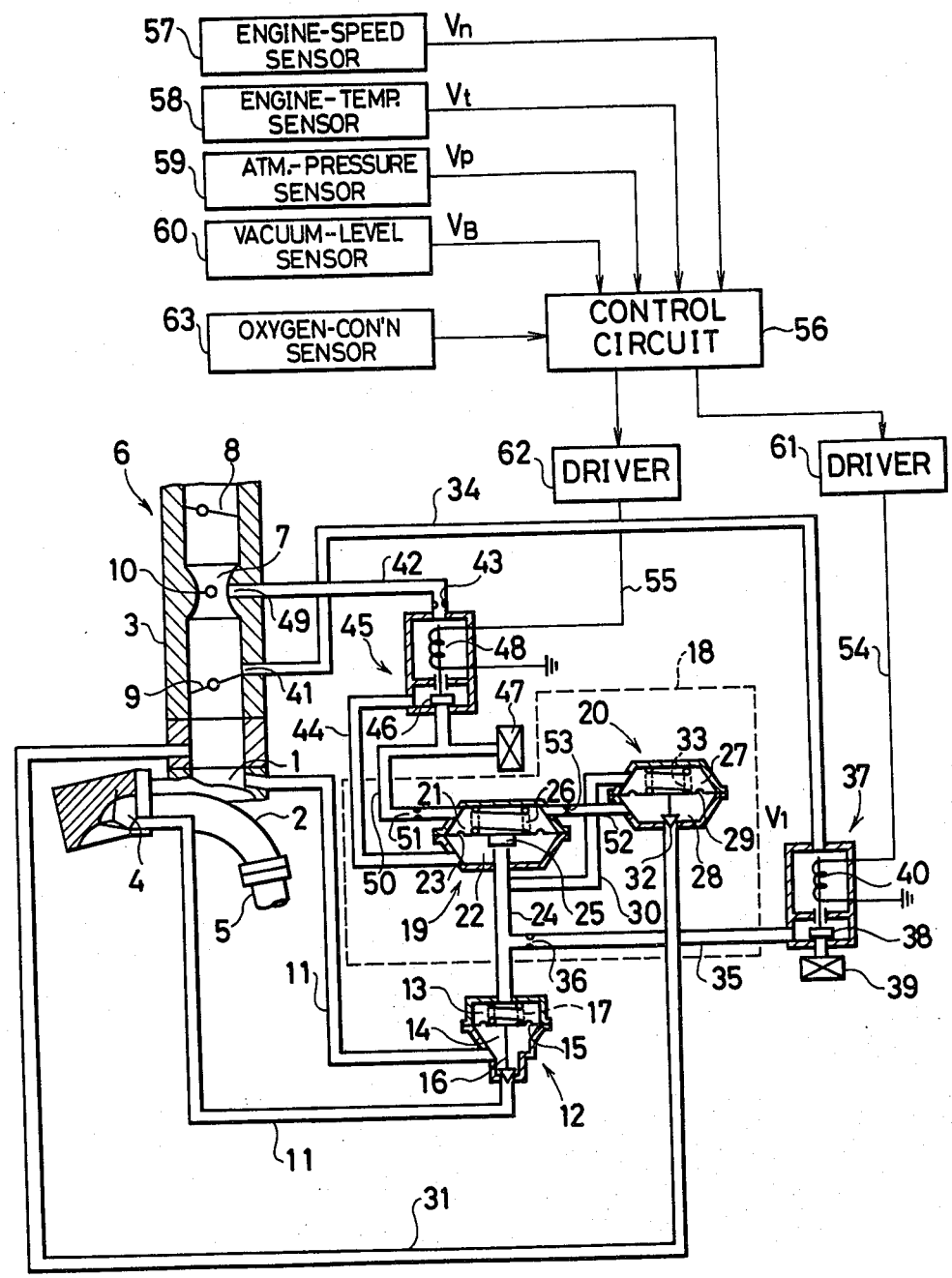
FIG. 1 is a schematic view showing a control system adapted to put a method according to the present invention into practice in an exhaust-gas recirculation system of an automotive internal combustion engine.

Referring to FIG. 1 of the drawings, an automotive internal combustion engine into which a method according to the present invention is to be put into practice is shown comprising intake and exhaust manifolds 1 and 2 which form part of intake and exhaust systems, respectively, of the engine. The intake manifold 1 leads to the respective intake ports (not shown) in the individual power cylinders of the engine from a mixture induction pipe 3, while the exhaust manifold 2 leads from the respective exhaust ports 4 in the power cylinders of the engine to an exhaust pipe 5. The mixture induction pipe 3 forms part of a carburetor 6 and is formed with a constriction of venturi 7. The venturi 7 communicates upstream with an air cleaner (not shown) across a choke valve 8 and downstream with the intake manifold 1 across a throttle valve 9. A fuel discharge nozzle leading from a fuel reservoir or float bowl (not shown) is open in the venturi 7 as indicated at 10.

The internal combustion engine thus constructed generally is provided with an exhaust-gas recirculation (EGR) system which comprises an exhaust-gas recirculation passageway 11 leading from the exhaust ports 4 of the power cylinders to the intake manifold 1 of the engine across a vacuum-operated recirculation-rate control valve unit 12. The recirculation-rate control valve unit 12 comprises a hollow valve housing which is internally divided into two variable-volume chambers consisting of a vacuum chamber 13 and a control chamber 14 by means of a flexible diaphragm 15 secured along its perimeter to the valve housing. The recirculation-rate control valve unit 12 further comprises a valve element 16 which axially extends in the control chamber 14 from the diaphragm 15 and which is movable into and out of the exhaust-gas recirculation passageway 11. The valve element 16 is urged to close the exhaust-gas recirculation passageway 11 by suitable biasing means which is shown comprising a helical compression spring 17 positioned within the vacuum chamber 13 and seated at one end on the diaphragm 15.

Vacuum is developed in the vacuum chamber 13 of the recirculation-rate control valve unit 12 under the control of vacuum control valve means 18 which is composed of the combination of an air-vacuum control valve unit 19 and an air-circulation rate control valve unit 20. The air-vacuum control valve unit 19 comprises a hollow valve housing which is internally divided into two variable-volume chambers consisting of a vacuum chamber 21 and a control chamber 22 by means of a flexible diaphragm 23 secured along its perimeter to the valve housing. The control chamber 22 of the air-vacuum control valve unit 19 is communicable with the vacuum chamber 13 of the recirculation-rate control valve unit 12 through a control vacuum passageway 24. The air-vacuum control valve unit 19 further comprises a valve element 25 which is securely attached to the diaphragm 23 and projects into the control chamber 22. The valve element 25 is urged to close the control vacuum passageway 24 by suitable biasing means such as a helical compression spring 26 positioned within the vacuum chamber 21 and seated at one end on the diaphragm 23. The air-circulation rate control valve unit 20 is constructed similarly to the valve element and thus comprises a hollow valve housing which is internally divided into two variable-volume chambers consisting of a vacuum chamber 27 and a control chamber 28 by means of a flexible diaphragm 29 secured along its perimeter to the valve housing. The vacuum chamber 27 of the air-circulation rate control valve unit 20 communicates with the control vacuum passageway 24 through a vacuum passageway 30 and the control chamber 28 of the valve unit 20 is communicable with the mixture induction pipe 3 downstream of the throttle valve 9 through an air-circulation bypass passageway 31. The air-circulation rate control valve unit 20 further comprises a valve element 32 which axially extends in the control chamber 28 from the diaphragm 29 and which is movable into and out of the air-circulation bypass passageway 31. The valve element 32 is urged to close the air-circulation bypass passageway 31 by suitable biasing means which is shown comprising a helical compression spring 33 positioned within the vacuum chamber 27 and seated at one end on the diaphragm 29.

The above mentioned control vacuum passageway 24 is communicable with the mixture induction pipe 3 through a first vacuum detecting passageway 34 leading from the mixture induction pipe 3, a first air/vacuum passageway 35 leading to the control vacuum passageway 24 and formed with an orifice 36 and a first solenoid-operated valve unit 37 provided between the vacuum detecting passageway 34 and the air/vacuum passageway 35. The first solenoid-operated valve unit 37 comprises a valve element 38 which is movable between a position providing communication between the vacuum detecting passageway 34 and the air/vacuum passageway 35 as shown and a position isolating the vacuum detecting passageway 34 from the air/vacuum passageway 35 and allowing the latter to be open to the atmosphere through an air filter 39. The valve element 38 is integral or otherwise movable with a solenoid plunger surrounded by a solenoid coil 40 and is driven to move into the position isolating the vacuum detecting passageway 34 from the air/vacuum passageway 35 and allowing the passageway 35 to be open to the atmosphere when the solenoid coil 40 is energized. When, on the other hand, the solenoid coil 40 remains de-energized, the valve element 38 is held in the position providing communication between the vacuum detecting and air/vacuum passageways 34 and 35. The first vacuum detecting passageway 34 is open into the mixture induction pipe 3 through a first vacuum detecting port 41 which is located in the vicinity of the throttle valve 9 as shown. A vacuum $P_c$ developed in the mixture induction pipe 3 in the vicinity of the throttle valve 9 is thus at all times introduced into the first vacuum detecting passageway 34. On the other hand, the control chamber 22 of the above described air-vacuum control valve unit 19 is communicable with the venturi 7 of the mixture induction pipe 3 through a second vacuum detecting passageway 42 leading from the venturi 7 and formed with an orifice 43, a second air/vacuum passageway 44 leading to the control chamber 22 of the air-vacuum control valve unit 19 and a second solenoid-operated valve unit 45 provided between the vacuum detecting passageway 42 and the air/vacuum passageway 44. The second solenoid-operated valve unit 45 comprises a valve element 46 which is movable between a position providing communication between the second vacuum detecting passageway 42 and the second air/vacuum passageway 44 as shown and a position isolating the vacuum detecting passageway 42 from the air/vacuum passageway 44 and allowing the latter to be open to the atmosphere through an air filter 47. The valve element 46 is integral or otherwise movable with a solenoid plunger surrounded by a solenoid coil 48 and is driven to move into the position isolating the vacuum detecting passageway 42 from the air/vacuum passageway 44 and allowing the passageway 44 to be open to the atmosphere when the solenoid coil 48 is energized. When, on the other hand, the solenoid coil 48 remains de-energized, the valve element 46 is held in the position providing communication between the vacuum detecting and air/vacuum passageways 42 and 44. The second vacuum detecting passageway 42 is open into the venturi 7 of the mixture induction pipe 3 through a second vacuum detecting port 49 which is located in the vicinity of the outlet end 10 of the fuel discharge nozzle opening into the venturi 7. A vacuum $P_v$ developed in the venturi 7 of the mixture induction pipe 3 is thus at all times introduced into the second vacuum detecting passageway 42. The vacuum chamber 21 of the above described air-vacuum control valve unit 19 communicates with the atmosphere through, for example, the air filter 47 and a vacuum passageway 50 having an orifice 51 provided therein and further with the control chamber 28 of the air-circulation rate control valve unit 20 through a vacuum passageway 52 having an orifice 53 provided therein.

The solenoid coils 40 and 48 of the first and second solenoid-operated valve units 37 and 45 are electrically connected through lines 54 and 55, respectively, to a control circuit 56. The control circuit 56 has input terminals connected to various sensors which consist of an engine-speed sensor 57 responsive to the output speed of the engine and operative to produce an output voltage $V_n$ representative of the detected engine output speed, an engine-temperature sensor 58 responsive to the temperature of the cooling water for the engine and operative to produce an output voltage $V_t$ representative of the detected temperature of the engine cooling water, an atmospheric-pressure sensor 59 responsive to the atmospheric pressure and operative to produce an output voltage $V_p$ representative of the detected atmospheric pressure, and a vacuum-level sensor 60 responsive to the vacuum developed in the intake manifold 1 of the engine and operative to produce an output voltage $V_B$ representative of the detected intake manifold vacuum pressure downstream of the throttle valve 9. The control circuit 56 further has two output terminals which are connected through first and second driver circuits 61 and 62 to the lines 54 and 55 and through the lines 54 and 55 to the solenoid coils 40 and 48 of the first and second solenoid-operated valve units 37 and 45, respectively. The control circuit 56 preferably consists of a microprocessor.

When, now, the engine is in operation at a temperature higher than a predetermined value, the control circuit 56 produce a command signal to maintain the solenoid coils 40 and 48 of the valve units 37 and 45 de-energized on the basis of the output signal $V_t$ from the engine-temperature sensor 58. The valve element 38 of the valve unit 37 is thus held in the position providing communication between the first vacuum detecting passageway 34 and the first air/vacuum passageway 35 and, likewise, the valve element 46 of the valve unit 45 is held in the position providing communication between the second vacuum detecting passageway 42 and the second air/vacuum passageway 44 as shown. Under these conditions, the vacuum $P_c$ developed in the mixture induction pipe 3 in the vicinity of the throttle valve 9 is circulated through the first vacuum detecting passageway 34, first solenoid-operated valve unit 37, first air/vacuum passageway 35, control vacuum passageway 24 and vacuum passageway 30 to the vacuum chamber 27 of the air-circulation rate control valve unit 20. If the force resulting from the vacuum $P_c$ thus acting on the diaphragm 29 of the valve unit 20 is larger than the opposing force of the spring 33, the diaphragm 29 is deformed in a direction to contract the vacuum chamber 27 with the result that the valve element 32 is moved to allow the air-circulation bypass passageway 31 to be open to the control chamber 28 of the valve unit 20. It therefore follows that atmospheric air admitted into the vacuum passageway 50 through the air filter 47 is passed through the control chamber 21 of the air-vacuum control valve unit 19 and the vacuum passageway 53 into the control chamber 28 of the air-circulation rate control valve unit 20 and is further circulated by way of the air-circulation bypass passageway 31 into the intake manifold 1 of the engine. When the vacuum chamber 21 of the air-vacuum control valve unit 19 and the control chamber 28 of the air-circulation rate control valve unit 20 communicate in series with the intake manifold 1 of the engine, vacuums $P_1$ and $P_2$ obtain in these chambers 21 and 28. These vacuums $P_1$ and $P_2$ are determined by the ratio between the effective cross sectional areas of the orifices 51 and 53 respectively provided in the vacuum passageways 50 and 52.

The valve element 46 of the second solenoid-operated valve unit 45 being held in the position providing communication between the second vacuum detecting passageway 42 and the second air/vacuum passageway 44 as above described, the vacuum $P_v$ developed in the venturi 7 of the mixture induction pipe 3 is circulated through the second vacuum detecting passageway 42, second solenoid-operated valve unit 45 and second air/vacuum passageway 44 to the control chamber 22 of the air-vacuum control valve unit 19. If, in this instance, the force resulting from the difference between the vacuum $P_v$ thus acting on the diaphragm 23 from the control chamber 22 and the vacuum $P_1$ acting on the diaphragm 23 from the vacuum chamber 21 as above discussed is larger than the opposing force of the spring 26, the diaphragm 23 is deformed in a direction to contract the vacuum chamber 21 with the result that the valve element 25 is moved to allow the control vacuum passageway 24 to be open to the control chamber 22. It therefore follows that the vacuum $P_v$ circulated through the solenoid-operated valve unit 45 is directed through the control chamber 22 of the valve unit 19, control vacuum passageway 24 and vacuum passageway 30 into the vacuum chamber 27 of the air-circulation rate control valve unit 20 so that the vacuum $P_c$ developed in the vacuum chamber 27 through the first solenoid-operated valve unit 37 is modified by the vacuum $P_v$ circulated through the second solenoid-operated valve unit 45. The reduction in the vacuum $P_c$ in the vacuum chamber 27 of the valve unit 20 gives rise to a decrease in the degree of opening of the valve element 32 and accordingly to a decrease in the flow rate of air from the vacuum passageway 52 to the air-circulation bypass passageway 31. The reduction in the flow rate of air through the vacuum passageway 52 in turn results in reduction in the vacuum $P_1$ in the vacuum chamber 21 of the air-vacuum control valve unit 19 so that the valve element 25 is caused to restore its initial position closing the control vacuum passageway 24. The control vacuum passageway 24 and accordingly the vacuum passageway 30 being thus isolated from the air/vacuum passageway 44, there is for a second time caused an increase in the vacuum in the vacuum chamber 27 of the air-circulation rate control valve unit 20. The above described cycle is repeated at a high frequency so that vacuums $P_v$ and $P_e$ are ultimately developed in the control chamber 22 of the air-vacuum control valve unit 19 and the vacuum chamber 27 of the air-circulation rate control valve unit 20, respectively, in a ratio which is equalized with the ratio between the vacuum $P_1$ developed in the vacuum chamber 21 of the valve unit 19 and the vacuum $P_2$ developed in the control chamber 28 of the valve unit 20.

When the engine is operating at a relatively low intake rate with the throttle valve 9 of the carburetor 6 open to a relatively small degree, the vacuum $P_v$ developed in the venturi 7 of the mixture induction pipe 3 and accordingly in the control chamber 22 of the air-vacuum control valve unit 19 is maintained at relatively low levels (in negative pressure value). The vacuum $P_1$ developed in the vacuum chamber 21 of the valve unit 19 is therefore higher in negative pressure value than the vacuum $P_v$ in the control chamber 22 of the valve unit 19. The valve element 25 of the valve unit 19 therefore tends to allow the control vacuum passageway 24 to be open to the control chamber 22 with a consequent decrease in the vacuum $P_e$ in the vacuum chamber 27 of the air-circulation rate control valve unit 20. When, on the other hand, the engine is operating at a relatively high intake rate with the throttle valve 9 of the carburetor 6 open to a relatively large degree, the vacuum $P_v$ in the venturi 7 of the mixture induction pipe 3 and in the control chamber 22 of the air-vacuum control valve unit 19 is maintained at relatively high levels. The vacuum $P_1$ developed in the vacuum chamber 21 of the valve unit 19 is therefore lower in negative pressure value than the vacuum $P_v$ in the control chamber 22 of the valve unit 19. The valve element 25 of the valve unit 19 therefore tends to close the control vacuum passageway 24 with a consequent increase in the vacuum $P_e$ in the vacuum chamber 27 of the air-circulation rate control valve unit 20. Since the vacuum $P_e$ is developed not only in the vacuum chamber 27 of the air-circulation rate control valve unit 20 but in the vacuum chamber 17 of the recirculation-rate control valve unit 12, the flow rate of air in the air-circulation bypass passageway 31, viz., the rate at which atmospheric air is additionally supplied to the intake manifold 1 of the engine through the passageway 31 varies in direct proportion to the rate at which exhaust gases are recirculated through the exhaust-gas recirculation passageway 11 across the recirculation-rate control valve unit 12. Thus, exhaust gases are recirculated to the intake manifold 1 of the engine at a rate which is variable in a fixed ratio to the rate at which air is supplied to the intake manifold 1. The particular ratio is herein referred to as a required exhaust-gas recirculation ratio and is determined by the ratio between the vacuums $P_v$ and $P_e$, viz., the ratio between the effective cross sectional areas of the orifices 51 and 53 in the vacuum passageways 50 and 52.

When the engine is operating cold, viz., at a temperature lower than a predetermined value, the control circuit 56 produce a command signal to maintain the solenoid coil 40 of the first solenoid-operated valve unit 37 energized through the first driver circuit 61 on the basis of the output signal $V_t$ from the engine-temperature sensor 58. The valve element 38 of the valve unit 37 is thus held in the position isolating the first vacuum detecting passageway 34 from the first air/vacuum passageway 35 and allowing the air/vacuum passageway 35 to be open to the atmosphere through the air filter 39. As a consequence, atmospheric air is admitted through the air filter 39 and the solenoid-operated valve unit 37 into the vacuum passageway 35 and is distributed through the control vacuum passageway 24 to the vacuum chamber 13 of the recirculation-rate control valve unit 12 and through the vacuum passageway 30 to the vacuum chamber 27 of the air-circulation rate control valve unit 20. The atmospheric air directed into the vacuum chamber 13 of the recirculation-rate control valve unit 12 acts, in cooperation with the spring 17, on the diaphragm 15 and causes the valve element 16 to close the exhaust-gas recirculation passageway 11 and, likewise, the atmospheric air directed into the vacuum chamber 27 of the air-circulation rate control valve unit 20 acts, in cooperation with the spring 33, on the diaphragm 29 and causes the valve element 32 to close the air-circulation bypass passageway 31. The recirculation of exhaust gases to the intake manifold 1 through the exhaust-gas recirculation passageway 11 and the supply of additional air to the intake manifold 1 through the air-circulation bypass passageway 31 are thus cut off when the engine is operating cold.

Figure 2:
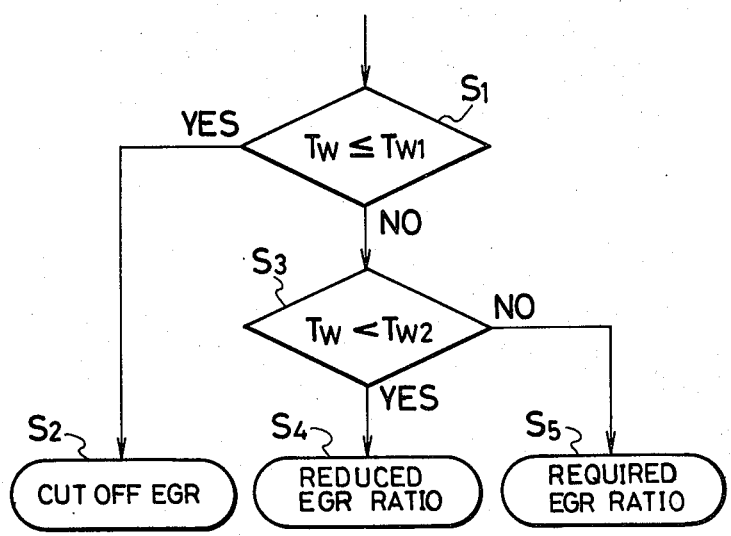
FIG. 2 is a flowchart showing some steps to carry out the method according to the present invention.

In the system proposed by the present invention, the recirculation of exhaust gases is controlled not only as described above but during a transient period of time intervening between the conditions in which the engine is operating cold and the conditions in which the engine is warmed up. For this purpose, the control circuit 56 is programmed to carry out the steps shown in the flowchart of FIG. 2. In a first step S1 of the control program, it is determined whether or not the temperature $T_w$ of the engine cooling water as represented by the signal voltage $V_t$ delivered from the engine-temperature sensor 58 is lower than a first predetermined value $T_{w1}$. If the temperature $T_w$ is lower than or equal to the predetermined value $T_{w1}$, the step S1 is followed by a second step S2 in which the solenoid coil 40 of the first solenoid-operated valve unit 37 is energized through the first driver circuit 61 so as to hold the exhaust-gas recirculation system inoperative as hereinbefore described. If, on the contrary, the detected temperature $T_w$ of engine cooling water is higher than the first predetermined value $T_{w1}$, then it is further determined in a third step S3 whether or not the temperature $T_w$ is lower than a second predetermined value $T_{w2}$ which is larger than the first predetermined value $T_{w1}$.

If, in this instance, the detected temperature $T_w$ of engine cooling water is found lower than the second predetermined value $T_{w2}$, the third step S3 is followed by a fourth step S4 in which the control circuit 56 produces a command signal to effect recirculation of exhaust gases at a rate variable with a predetermined reduced exhaust-gas recirculation ratio smaller (denoted by R' in FIG. 2) than the previously mentioned required exhaust-gas recirculation ratio (denoted by R in FIG. 2) to the rate at which atmospheric air is to be circulated to the intake manifold 1 through the air-circulation bypass passageway 31. In response to the signal thus delivered from the control circuit 56, the solenoid coil 48 of the second solenoid-operated valve unit 45 is energized through the second driver circuit 62 with the solenoid coil 40 of the first solenoid-operated valve unit 37 de-energized. The solenoid coil 48 being thus energized, the valve element 46 of the solenoid-operated valve unit 45 is moved to the position isolating the second vacuum detecting passageway 42 from the second air/vacuum passageway 44 and allowing the air/vacuum passageway 44 to be open to the atmosphere through the air filter 47. Atmospheric air is now directed by way of the second air/vacuum passageway into the control chamber 22 of the air-vacuum control valve unit 19 and acts on the diaphragm 23, causing the diaphragm to deform in a direction to contract the vacuum chamber 21 against the force of the spring 26. It therefore follows that the valve element 25 is moved to a position permitting the control vacuum passageway 24 to be fully open to the control chamber 22 of the valve unit 19 with a resultant decrease in the vacuum $P_e$ in the control vacuum passageway 24. The vacuum $P_e$ in the passageway 24 being thus reduced, the diaphragm 15 of the recirculation-rate control valve unit 12 is deformed in a direction to expand the vacuum chamber 13 so that the valve element 16 is moved in a direction to reduce the flow rate of the exhaust gases to be recirculated through the valve unit 12. The reduction in the exhaust-gas recirculation rate results in a decrease in the exhaust-gas recirculation ratio although the flow rate of air through the air-circulation rate control valve unit 20 is also reduced due to the reduction in the vacuum $P_e$ in the vacuum chamber 27 of the valve unit 20.

If, on the contrary, the detected temperature $T_w$ of engine cooling water is found higher than or equal to the second predetermined value $T_{w2}$, then it is determined that the engine has been warmed up. The third step S3 is thus followed by a fifth step S5 in which the control circuit 56 produces a command signal to effect recirculation of exhaust gases with the required exhaust-gas recirculation ratio R. In response to the signal thus delivered from the control circuit 56, both of the solenoid coil 40 of the first solenoid-operated valve unit 37 and solenoid coil 48 of the second solenoid-operated valve unit 45 is de-energized as previously described.

Figure 3:
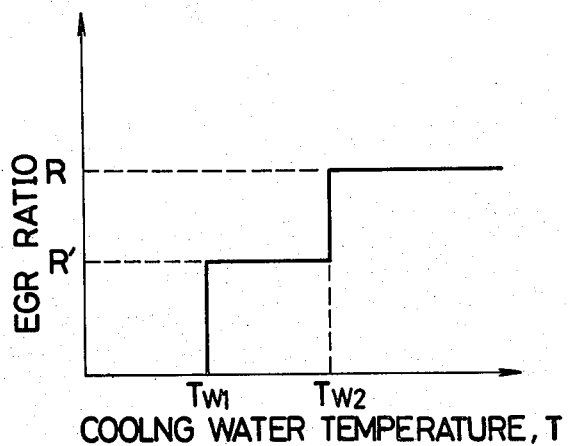
FIG. 3 is a graph showing a preferred example of the relationship between the temperature of engine cooling water and the exhaust-gas recirculation ratio controlled in accordance with the present invention.
Figure 4:
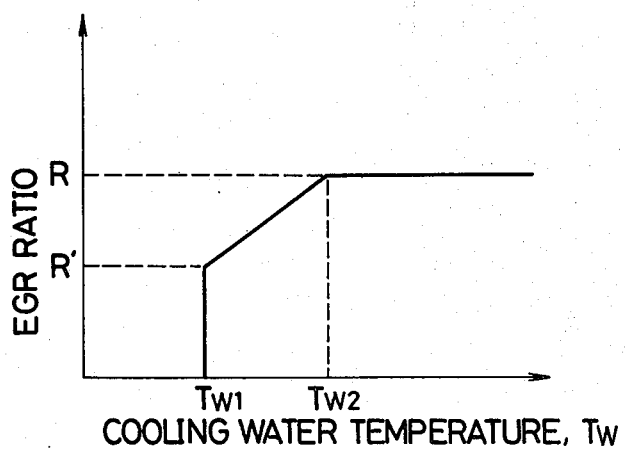
FIG. 4 is a graph showing another preferred example of the relationship between the temperature of engine cooling water and exhaust-gas recirculation ratio controlled in accordance with the present invention.
Figure 5:
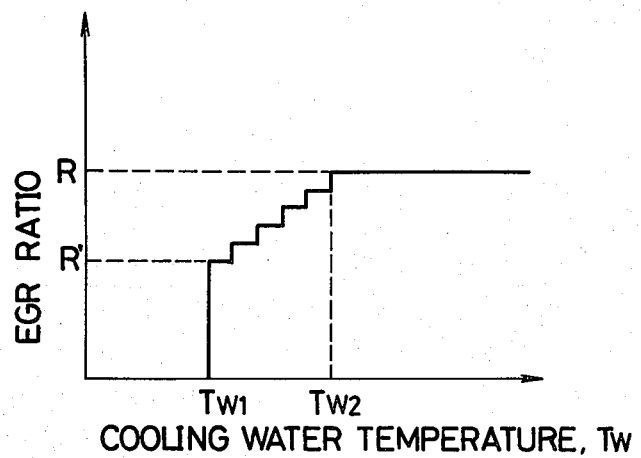
FIG. 5 is a graph showing another preferred example of the relationship between the temperature of engine cooling water and the exhaust-gas recirculation ratio controlled in accordance with the present invention.

It will have been understood that, in accordance with the present invention, exhaust gases are recirculated at the predetermined reduced exhaust-gas recirculation ratio R' during a period of time when the detected temperature $T_w$ of engine cooling water is higher than the first predetermined value $T_{w1}$ and lower than the second predetermined value $T_{w2}$ higher than the value $T_{w1}$, as will be seen from the plot of FIG. 3. If desired, the current to be supplied to the solenoid coil 48 of the solenoid-operated valve unit 45 may energized for a continuously or stepwise reduced period of time so that the exhaust-gas recirculation ratio is increased from zero to the maximum value, viz., the required exhaust-gas recirculation ratio R either continuously as indicated in FIG. 4 or stepwise as indicated in FIG. 5 as the temperature $T_w$ of engine cooling water rises.

While, furthermore, it has been described that the exhaust-gas recirculation ratio is regulated depending upon the temperature of the engine cooling water, the exhaust-gas recirculation ratio may be controlled through detection of the variation in the output voltage or internal resistance of a oxygen-concentration sensor 63. As is well known in the art, the oxygen-concentration sensor 63 is ordinarily used in an internal combustion engine provided with an air-fuel ratio control system and exhibits an internal resistance which decreases gradually as the sensor is activated after the engine is started. When such a oxygen-concentration sensor 63 is incorporated into the exhaust-gas recirculation control system proposed by the present invention as indicated at 63 in FIG. 3, the control circuit 56 may be programmed so that (1) the recirculation of exhaust gases is interrupted when the internal resistance of the oxygen-concentration sensor 63 is larger than a first predetermined value, (2) the recirculation of exhaust gases is effected with a reduced exhaust-gas recirculation ratio when the internal resistance of the sensor 63 is smaller than the first predetermined value and larger than a second predetermined value which is smaller than the first predetermined value and (3) the recirculation of exhaust gases is effected with a required exhaust-gas recirculation ratio when the internal resistance of the sensor 63 is smaller than the second predetermined value. If the internal combustion engine using such a oxygen-concentration sensor 63 is of the type in which the exhaust gases to be detected by the sensor is set lean circumstance until the sensor is fully activated, it may be determined that the engine is warmed up to an operating temperature when the internal resistance exhibited by the sensor is reduced to a predetermined value and after exceeding a predeterming time of period.

What is claimed is:

1. A method of controlling the recirculation of exhaust gases in an internal combustion engine provided with an exhaust-gas recirculation system by which the exhaust gases emitted from the exhaust manifold are partially recirculated into the intake manifold of the engine, comprising cutting off the recirculation of exhaust gases to the intake manifold of the engine when the engine is being warmed up, recirculating exhaust gases to the intake manifold of the engine at a rate variable in a predetermined required exhaust-gas recirculation ratio to the rate at which air is circulated to the intake manifold of the engine after the engine is warmed up, and recirculating exhaust gases to the intake manifold of the engine with a reduced exhaust-gas recirculation ratio lower than said required exhaust-gas recirculation ratio during a transient period of time intervening the conditions in which the engine is being warmed up and the conditions in which the engine has been warmed up.

2. A method as set forth in claim 1, in which said reduced exhaust-gas recirculation ratio is continuously varied from a predetermined value to said required exhaust-gas recirculation ratio.

3. A method as set forth in claim 1, in which said reduced exhaust-gas recirculation ratio is stepwise varied from a predetermined value to said required exhaust-gas recirculation ratio.

4. A method as set forth in claim 3, further comprising detecting the temperature of the cooling water for the engine, wherein recirculation of exhaust gases is cut off when the detected temperature of the engine cooling water is lower than a first predetermined value and wherein recirculation of exhaust gases is effected with said required exhaust-gas recirculation ratio when the detected temperature of the engine cooling water is higher than a second predetermined value larger than said first predetermined value and with said reduced exhaust-gas recirculation ratio when the detected temperature of the cooling water is higher than said first predetermined value and lower than said second predetermined value.

5. A method as set forth in claim 1, 2 or 3, in which the time at which the engine is warmed to a desired temperature is determined through detection of the activation of an oxygen-concentration sensor.

6. A method as set forth in claim 3, in which the time at which the engine is warmed to a desired temperature is determined through detection of the internal resistance of an oxygen-concentration sensor, wherein recirculation of exhaust gases is cut off when the internal resistance of the oxygen-concentration sensor is larger than a first predetermined value and wherein recirculation of exhaust gases is effected with said required exhaust-gas recirculation ratio when the internal resistance of the oxygen-concentration sensor is smaller than a second predetermined value smaller than the first predetermined value and with said reduced exhaust-gas recirculation ratio when the internal resistance of said oxygen-concentration sensor is smaller than said first predetermined value and larger than said second predetermined value.

* * * * *